United States Patent
Norwitz et al.

(10) Patent No.: US 9,969,484 B2
(45) Date of Patent: May 15, 2018

(54) ADJUSTABLE HEIGHT CYCLIC CONTROL ASSEMBLY AND METHOD

(71) Applicants: Grant Norwitz, Olympia, WA (US); James Fletcher, Olympia, WA (US)

(72) Inventors: Grant Norwitz, Olympia, WA (US); James Fletcher, Olympia, WA (US)

( * ) Notice: Subject to any disclaimer, the term of this patent is extended or adjusted under 35 U.S.C. 154(b) by 24 days.

(21) Appl. No.: 15/056,337

(22) Filed: Feb. 29, 2016

(65) Prior Publication Data
US 2016/0176511 A1 Jun. 23, 2016

Related U.S. Application Data

(60) Provisional application No. 61/121,114, filed on Feb. 26, 2015.

(51) Int. Cl.
*B64C 13/06* (2006.01)
*B64C 13/12* (2006.01)

(52) U.S. Cl.
CPC .............. *B64C 13/06* (2013.01); *B64C 13/12* (2013.01)

(58) Field of Classification Search
CPC ........ B64C 13/06; B64C 13/12; F16H 25/205
See application file for complete search history.

(56) References Cited

U.S. PATENT DOCUMENTS

| | | | | |
|---|---|---|---|---|
| 3,902,379 A * | 9/1975 | Bennett | ................. | B64C 13/12 244/220 |
| 4,473,203 A * | 9/1984 | Barnoin | ................. | B64C 13/12 244/224 |
| 5,149,023 A * | 9/1992 | Sakurai | ................. | B64C 13/12 244/229 |
| 5,427,336 A * | 6/1995 | Haggerty | ................. | B64C 13/12 244/229 |
| 5,456,428 A * | 10/1995 | Hegg | ................. | B64C 13/12 244/229 |
| 5,522,568 A * | 6/1996 | Kamen | ................. | G05D 1/0858 244/17.13 |
| 5,527,004 A * | 6/1996 | Haggerty | ................. | B64C 13/12 244/229 |
| 5,900,710 A * | 5/1999 | Gautier | ................. | B64C 13/12 244/223 |
| 6,347,770 B1 * | 2/2002 | Oyzerskiy | ................. | B64C 13/12 244/221 |
| 6,572,055 B1 * | 6/2003 | Bernard | ................. | B64C 13/12 244/229 |
| 9,352,824 B2 * | 5/2016 | Piotrowski | ................. | B64C 13/04 |
| 2002/0135327 A1 * | 9/2002 | Szulyk | ................. | G05D 1/085 318/34 |
| 2008/0142642 A1 * | 6/2008 | Marino | ................. | B64C 13/503 244/223 |

* cited by examiner

*Primary Examiner* — Justin M Benedik
(74) *Attorney, Agent, or Firm* — Emerson, Thomson & Bennett, LLC; Roger D. Emerson

(57) ABSTRACT

Adjustable height control stick assembly for dual control of aircraft includes a single control stick for longitudinal and lateral orientation of the aircraft with the height adjustment allowing for correction of position prior to flight. The stick is connected to appropriate linkages to move the ailerons and elevator of an airplane or the rotor blades of a helicopter. When either the pilot or the copilot is flying the grip for the other is at a different height to that for normal operation. The invention replaces and makes adjustable the grip so that height of the grip of both pilot and copilot are the same as if they were flying and in control of the aircraft.

8 Claims, 2 Drawing Sheets

ADJUSTABLE HEIGHT CYCLIC CONTROL ASSEMBLY AND METHOD

Adjustable height control stick assembly for dual control of aircraft includes a single control stick for longitudinal and lateral orientation of the aircraft with the height adjustment allowing for correction of position prior to flight. The adjustable side replaces the already removable left/copilot side of the existing control and connects in the same manner and with the same hardware. As the stick is mounted on the center of the aircraft by a joint permitting lateral and longitudinal movement by a crossbar mounted on the stick. The crossbar is hinged vertically above the joint and is tiltable freely in a vertical plane. Grips are mounted on crossbar and located in front of each of the pilot and copilot so that each may control the aircraft through a single stick. The stick is connected to appropriate linkages to move the ailerons and elevator of an airplane or the rotor blades of a helicopter. When either the pilot or the copilot is flying the grip for the other is at a different height to that for normal operation. The invention replaces and makes adjustable the grip so that height of the grip of both pilot and copilot are the same as if they were flying and in control of the aircraft.

BACKGROUND OF THE INVENTION

This invention relates to an adjustable height control stick assembly for aircraft and improving the existing assembly that utilizes a single stick to provide for dual control of an aircraft enabling both the pilot and copilot to have equal control while both being in similar positions while having control.

The present tilting control system on Robinson R22, R44 and R66 helicopters as well as conventional control assemblies for lateral and longitudinal control of an aircraft operate by controlling the ailerons and elevator of an airplane or by controlling the cyclic pitch of the rotor of a helicopter. Normally, the control stick is located in front of the pilot and positioned between the pilot's knees. In a dual control aircraft, a separate stick is provided for each of the pilot and copilot, or in the Robinson design, the stick is centrally controlled and connected via a tilting crossbar.

Prior to the 1976 Robinson patent, in relatively small aircraft of dual control variety and which are intended to be relatively inexpensive, a complex and somewhat expensive mechanism is required to interconnect the two control sticks so that they move together in the longitudinal and lateral directions. Since the control stick is usually located between the pilot's knees, the pilot must climb over the stick when entering or leaving the aircraft. In the case of relatively small aircraft, this can be inconvenient, especially if the pilot or copilot is a lady wearing a dress.

Additionally, dual control aircraft usually have two sets of floor pedals so that the pilot sits with the stick between the knees and the feet aligned with or on the floor pedals. In this type of arrangement, the lateral movement of the stick is limited by the space between the pilot's knees, having in mind that the feet are on the pedals. The tilting system eliminates most of these issues while creating a differential in control grip height for either the pilot or the copilot that is not the same as if they both were in control in a conventional non tilting control system.

SUMMARY OF THE INVENTION

The present application claims priority to U.S. Provisional Application No. 61/121,114 which is incorporated by reference as if fully rewritten herein.

By the present invention, the difficulties of the prior art tilting dual control system are overcome while providing the advantages of a tilting dual control system, but with the adjustable height control, once ease of entrance has been gained, the height differential with the tiltable system can be remedied to return both grips to the normal flying position.

The present invention allows for the same ease of access as well as the ability to retain the simplicity of the present system, yet affords the flexibility of pilot size and position to be able to have the flight control be height adjustable to the normal flight position on both side of the cockpit.

The present invention is a modification on the utilization of a single control stick located near the center of the aircraft and between the pilot and copilot seats. As the stick is mounted to the aircraft structure by a joint that permits lateral and longitudinal movement of the stick but which prevents twisting around the vertical axis of the stick. Now with adjustable height prior to flight, both pilots can have the same handle position ensuring safer operation especially for training aircraft.

At present with the tilting system, attached at one free end of the stick are conventional linkages and the like for movement of the control surfaces of the aircraft, such as ailerons and elevator of an airplane, or the cyclic pitch of the rotor of a helicopter. The other end of the stick has a crossbar mounted on it by a hinge which permits the crossbar to tilt freely in a vertical plane but not about a vertical axis. Attached to each end of the crossbar is a pilot's grip such that each grip is located directly in front of the seat and attached to the control stick by the crossbar. In order to facilitate a non pilot sitting in the copilot seat, this grip is removable. The grip has a connector that connects the communications push to talk switch and plugs in to the central control and connected with a locking press to fit pin.

Each of the pilot or copilot may move the stick by manipulation of the grip much in the same fashion as if the control stick was located forward of each seat. The motion of the grip is transferred to the control stick by the crossbar and from the stick to those airfoils controlling longitudinal and lateral orientation of the aircraft. This entire mechanism has a hinge in the middle enabling this operation. It is this hinge that while offering simplicity of design, and ease of entry, places the grip for each pilot in different positions. The invention allows this difference to be corrected thus providing better control.

The hinge is a free hinge and as the pilot or copilot moves the grip laterally, the free hinge allows the crossbar to move horizontally without tilting while moving the stick laterally. To the pilot or copilot movement of the grip feels the same as though a stick were located in the position of the grip and in front of the pilot and copilot. Longitudinal movement of the grip effects longitudinal movement of the stick and again feels basically as though the pilot or copilot were moving a stick located between the legs, although unless adjustable, the height of the grip of the person not flying is usually significantly higher as the other person manipulates the controls.

The advantages of the present control stick assembly of this type are several. Dual controls are provided while maintaining the simplicity of a single control. This is especially advantageous for small aircraft intended to be inexpensive. There is convenient entry and egress from the seats simply by tilting the control stick and the crossbar out of the way. Functionally, the system of this invention provides greater lateral control travel since the grip on the crossbar easily passes over the knees and control stick movement is not restricted to the space between the knees. Whilst one of the significant advantages is greater pilot comfort and flying precision since the hinge on the crossbar allows the pilot to move the grip freely in the vertical direction without altering the stick setting. Thus, the pilot may move the crossbar around the hinge axis by moving the grip vertically enabling one to bring the grip down and to rest the forearm against the leg during flight.

The disadvantages are also apparent in the existing system. Should the aircraft be used for pilot training, the instructor has to fly with their hand in a different position to that of normal flight. The reaction time and distance the instructor needs to move their hand to gain control is significantly further and takes longer than in the normal flight position, and it is obvious to the student when the instructor is trying to help or take control because the grip is significantly higher than in normal flight. For petite instructors all of the above is magnified.

BRIEF DESCRIPTION OF THE DRAWINGS

FIG. 1 shows a Robinson tilting control with the copilot side installed. The pivot in the middle allows ease of entry and egress and has the height set by the person flying the aircraft. The quick release pin, which allows for installation or removal of the copilot side of the Robinson tilting control, is circled.

FIG. 2 shows a Robinson tilting control with the left or copilot side removed. The pin remains inserted within the tilting control. The removal point and pin located at the copilot side of the tilting control are circled.

DETAILED DESCRIPTION

Figure 1:
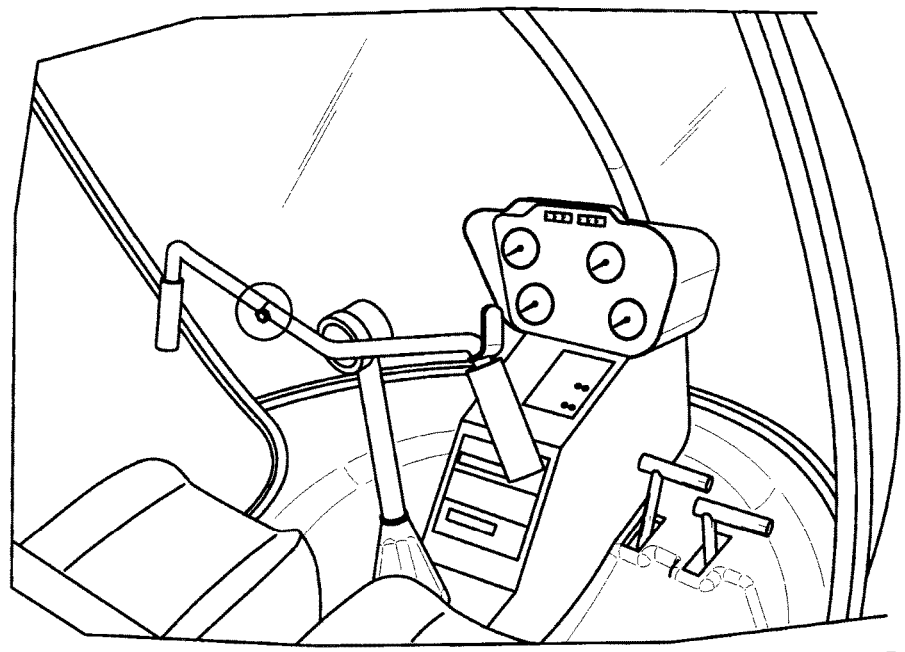
FIG. 1 is an illustration of the present tilting control installed in a Robinson helicopter. Specifically.

PRELIMINARY R-22 HELICOPTER SPECIFICATIONS Main rotor dia. 25.17 ft. Disk area 497.4 sq. ft. Disk loading at 1,230 lb. 2.473 psf. gross weight Rotor solidity 030 Blade twist −8 deg. Flapping angle to stops.+−0.12 deg. minimum Tip speed at 2,800 engine rpm 672 fps. Tail rotor dia. 0.42 in. Powerplant make & model Lycoming O-235-C2C Rating (takeoff or 115 hp. at 2,800 rpm. continuous Gross weight 1,230 lb. Empty weight 720 lb. Fuel weight (17 gal.) and oil 114 lb. Payload 396 lb. V.sub.NE 115 mph. Maneuvering load factor+3.5-0.5 Landing load factor+3.5 (landing gear+rotor) Maximum rotor tilt 12 deg. relative to shaft Performance at Gross Weight: Cruise airspeed at 75% power 100 mph. and s.l. Fuel consumption at economy 15 mpg. cruise Approximate range (no reserve) 250 mi. Rate of climb at sea level 1,500 ft./min. Service ceiling 14,000 ft. Hover ceiling (out of ground 5,200 ft. effect) Hover ceiling (in ground 6,500 ft. effect)

Figure 2:
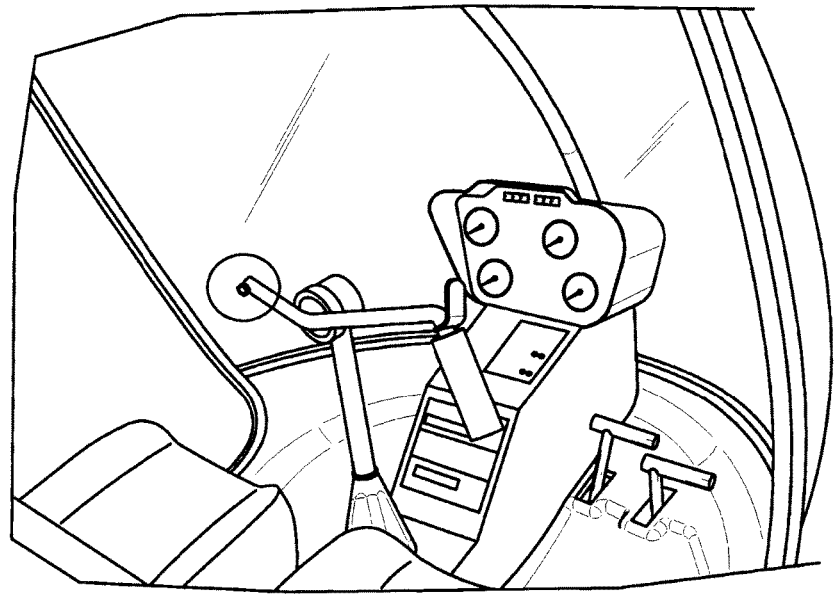
FIG. 2 is an illustration of the present tilting control in a Robinson helicopter. Specifically.
Figure 3:
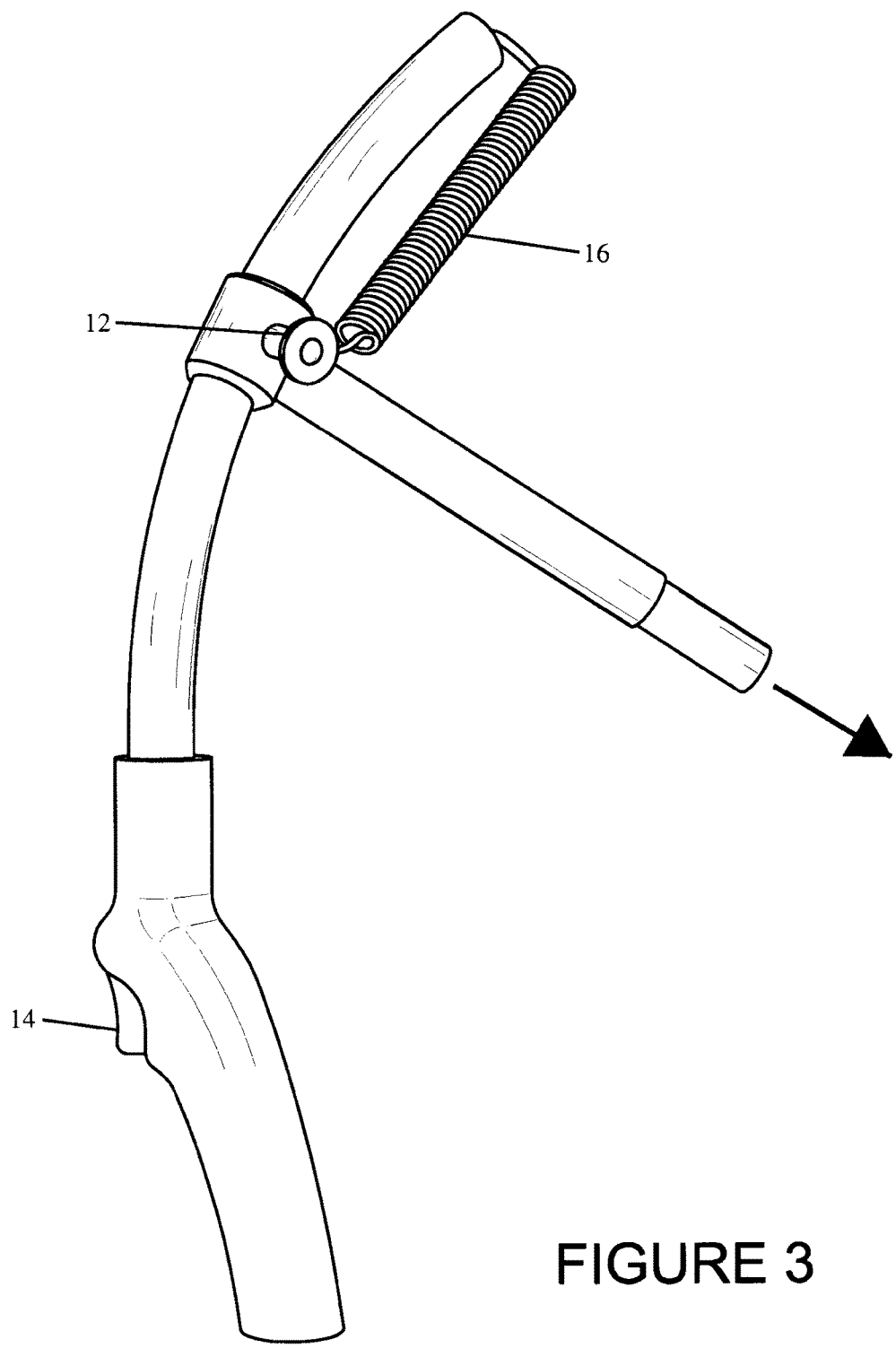
FIG. 3 illustrates the replacement control that plugs directly in where the removable control was, and attaches in exactly the same way as the existing removable control. As shown by the arrow illustrated within FIG. 3, the replacement control plugs directly into the existing cyclic and connects with the male/female electrical plug to the existing wiring. There is an additional adjustable point (12) with a removable locking pin that allows for the height of the control to be adjusted by a person sitting in the left seat of the aircraft. Thus, the removable pin (2) sets the height of the grip relative to the pilot. The replacement control includes a push to talk trigger (14) and a flexible cord (16) which allows an electrical signal to be sent through existing wiring. All functionality of the control is as per the original with the added ability and safety of height adjustment.

It is possible to use a power plant which is a high performance power plant, for example, a Lycoming O-320 (four cylinder opposed engine rated at 150 horsepower at 2700 rpm at sea level), or a much larger and more powerful helicopter such as shown in FIG. 2, the Robinson R44, or even more powerful and larger as mentioned above in the Robinson R66. This invention is independent of the helicopter size and power and enhances the control and comfort on any aircraft that utilizes the central tilting control mechanism.

The helicopter shown in FIG. 1 herein has an overall height of 8 feet 9 inches, an overall width including the skids of 6 feet 5 inches, and an overall length including the rotors of 28 feet 9 inches. The cabin height is 5 feet 8 inches with a width of 3 feet 8 inches. Thus, it can be seen that the unit is a relatively small, compact aircraft which provides dual control from either the pilot or copilot seat by a relatively simple control mechanism.

It will be apparent to those skilled in the art that various modifications and changes may be made without departing from the scope of the appended claims.

We claim:

1. A height adjustable grip for a cyclic in a dual control aircraft movable in a lateral and longitudinal direction and having airfoil surfaces to effect lateral and longitudinal orientation of the aircraft, wherein the aircraft is provided with side-by-side pilot and copilot seats arranged on each side of the center axis of the aircraft, the improvement comprising a single non-rotatable control stick with a height adjustable mechanism for lateral and longitudinal orientation of the aircraft, said control stick being located generally on the center axis of the aircraft, wherein said control stick comprises a joint for mounting said stick for pivotal movement in a lateral and longitudinal direction, a first crossbar hingedly mounted on a first side of said control stick vertically above said joint, a second crossbar hingedly mounted on a second side of said control stick vertically above said joint wherein said first and second crossbars are tiltable freely in a vertical plane without effecting aircraft orientation, a means connected to said control stick for effecting movement of said airfoil surfaces for lateral and longitudinal orientation of the aircraft in response to lateral and longitudinal movement of said control stick, and a grip mounted on said first and second crossbars spaced from a centered position of said control stick at an end of the first and second crossbars, wherein said control stick is located forward of and generally centered in front of each of said seats, wherein either the pilot or copilot may control lateral and longitudinal orientation of the aircraft through movement of said single control stick, wherein movement of said control stick by the pilot or copilot is effected by rotating one of said first or second crossbar hingedly mounted to said control stick in a downward direction so that the grip at the end of the first or second crossbar is adjacent to the pilot or the copilot, wherein at least one grip mounted on said first and second crossbars is removable and replaced with the adjustable grip at a connection point, wherein the adjustable grip comprises the height adjustable mechanism, wherein the height adjustable mechanism comprises a first extension having a first end and a second end that extends along a first axis and a second extension having a first end and a second end that extends along a second axis at an angle with respect to the first axis of the first extension, wherein the first end of the first extension plugs directly into the first or second crossbar at the connection point and the second end of the first extension comprises an adjustment mechanism for adjusting the position of the second extension with respect to the first extension, wherein the adjustable grip does not change how the control stick operates in any way.

2. The height adjustable grip of claim 1, wherein the second end of the second extension comprises a grip.

3. The height adjustable grip of claim 2, wherein the second end of the second extension comprises a push to talk trigger.

4. The height adjustable grip of claim 3, wherein the second end of the first extension comprises a sleeve that receives the second extension.

5. The height adjustable grip of claim 4, wherein the sleeve comprises a locking mechanism to fix the position of the second extension with respect to the first extension.

6. The height adjustable grip of claim 5, wherein the locking mechanism comprises a removable pin that fits within an aperture within the sleeve.

7. The height adjustable grip of claim 6, wherein the first end of the first extension which plugs directly into the first or second crossbar at the connection point includes a male/female electrical plug which electrically connects the height adjustable grip to existing wiring within the control stick.

8. The height adjustable grip of claim 7, wherein a flexible cord extends from the first end of the second extension to the removable pin and wherein an electrical signal is sent through the flexible cord.

\* \* \* \* \*